R. MILNE.
FEED FOR DRILL SPINDLES.
APPLICATION FILED APR. 14, 1913.
1,119,625.
Patented Dec. 1, 1914.
3 SHEETS—SHEET 1.
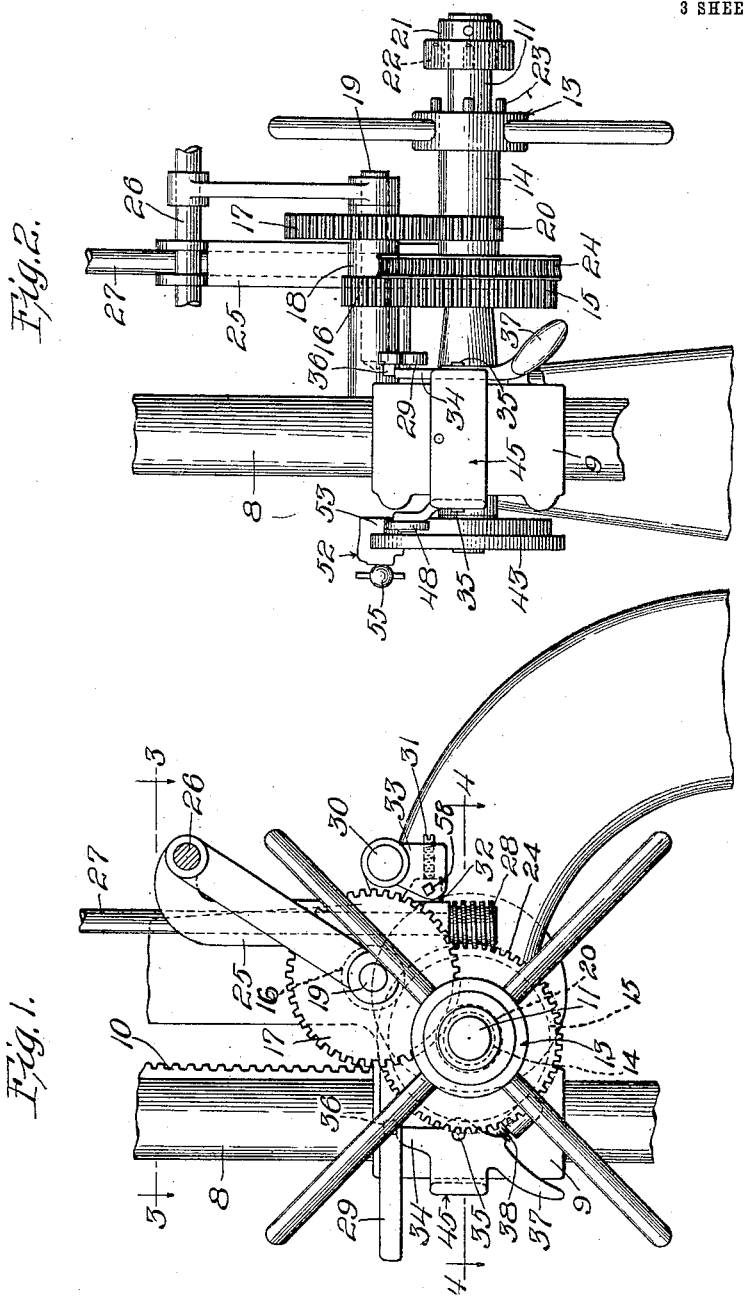
Witnesses:
Inventor:
Robert Milne
by Banning & Banning
Attys.

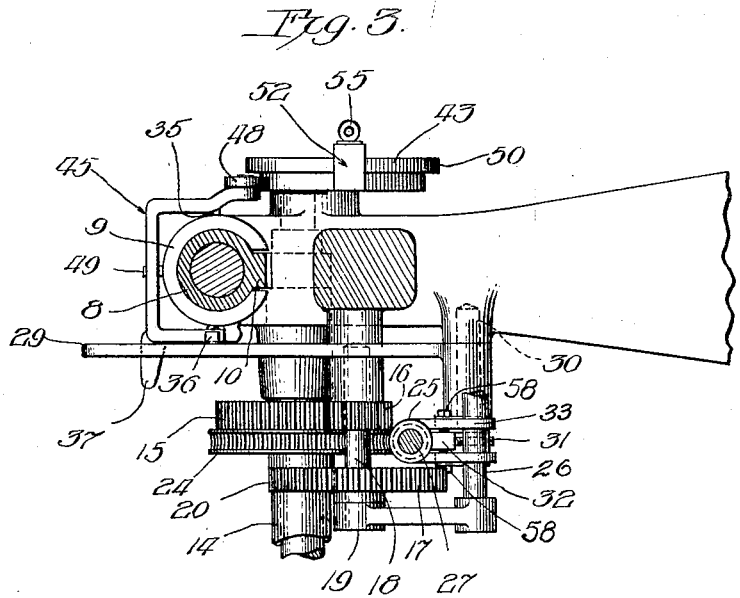
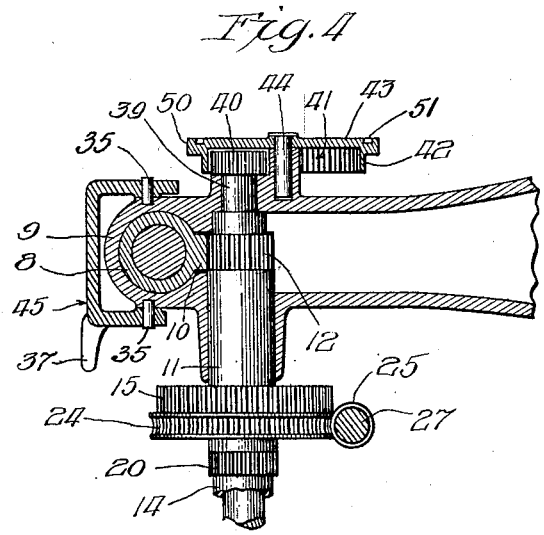

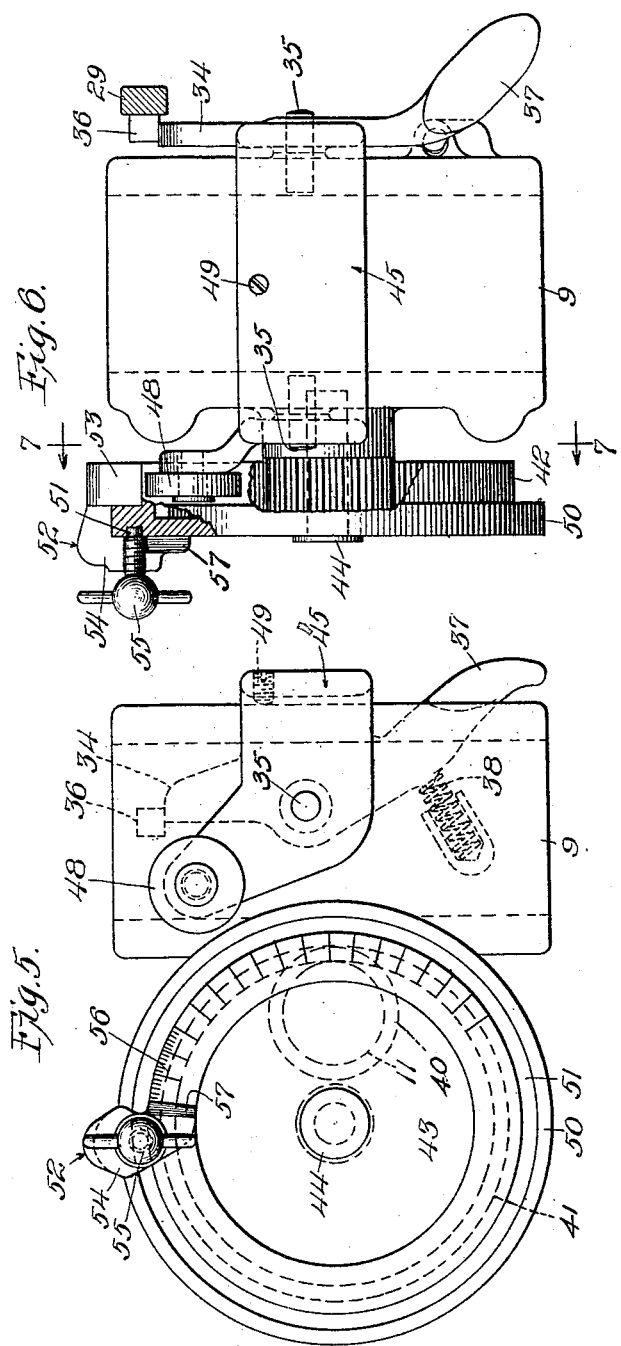

UNITED STATES PATENT OFFICE.

ROBERT MILNE, OF ROCKFORD, ILLINOIS, ASSIGNOR TO ROCKFORD DRILLING MACHINE COMPANY, OF ROCKFORD, ILLINOIS, A CORPORATION OF ILLINOIS.

FEED FOR DRILL-SPINDLES.

1,119,625.   Specification of Letters Patent.   Patented Dec. 1, 1914.

Application filed April 14, 1913. Serial No. 761,095.

*To all whom it may concern:*

Be it known that I, ROBERT MILNE, a citizen of the United States, residing at Rockford, in the county of Winnebago and State of Illinois, have invented certain new and useful Improvements in Feeds for Drill-Spindles, of which the following is a specification.

The present invention relates to certain improvements in feeds for drill spindles and has particular reference to that class of machine in which the spindle may be fed down automatically during the drilling operation. This insures a uniform feed of the drill and relieves the operator of the necessity of attending to this particular phase of the drilling operation. Automatic feeds are also used for the purpose of securing the desired uniformity of pressure on the cutting faces of the drill, and according to the nature of the drilling operation. Automatic feeds are frequently used on high speed machinery in which the descent of the drill spindle is fairly rapid. It is frequently desired to stop the drilling operation after it has been carried to a certain depth in the work, and where a machine is operating under high speed it is sometimes difficult to trip off the automatic feed before the drilling operation has proceeded too far. At any rate the operator must watch and follow the drilling operation so as to be able to disengage the feeding mechanism when the proper time arrives.

The main object of the present invention is to provide a device for automatically tripping the feeding mechanism after the drilling operation has proceeded to the desired depth so as to relieve the operator of the necessity of constantly watching the drilling operation, and so as to enable the operator to carry the drilling operation to exactly the desired depth regardless of any human factor, and regardless of the speed at which the drilling operation is proceeding.

Another object of the invention is to so construct the tripping mechanism or device that the same may be adjusted or set to allow the drilling operation to proceed to predetermined depths or distances, so that the mechanism can be adjusted beforehand to the exact requirement of the work in hand.

Another object is to so construct the tripping mechanism that the same can be associated with those forms of automatic feed which are well known in the art, thereby giving the mechanism or device of the present invention a wide range of applicability and usefulness.

Other objects and uses will appear from a detailed description of the invention which consists in the features of construction and combinations of parts hereinafter described and claimed.

In the drawings: Figure 1 shows a side view of one form of feed having mechanisms embodying the features of my invention associated therewith; Fig. 2 shows a front view of the mechanisms of Fig. 1; Fig. 3 shows a horizontal section taken substantially on the line 3—3 of Fig. 1 looking in the direction of the arrows; Fig. 4 shows a horizontal section taken substantially on the line 4—4 of Fig. 1 looking in the direction of the arrows; Fig. 5 shows an enlarged detail side view of one form of the tripping mechanism; Fig. 6 shows a front view corresponding to that of Fig. 5 with portions of the internal gear broken away; and Fig. 7 shows a detail on a small scale taken on the line 7—7 of Fig. 6 looking in the direction of the arrows.

In carrying into practice the features of my invention I provide a suitable form of mechanism such as a lock or the like which can be thrown into such a position that it will retain the feeding mechanism in engagement with the drill spindle to cause the same to feed. I then associate with such mechanism another mechanism operable according to the movements of the drill spindle itself and so constructed that after the drill spindle has partaken of the desired amount of movement the aforementioned lock will be engaged and tripped to thereby disengage the feeding mechanism from the drill spindle.

In the arrangement shown in the drawings the drill spindle is carried by a sleeve 8, adapted to have the desired amount of vertical travel within a post or the like 9. Said post is stationary and generally comprises a portion of the frame of the machine. A rack or the like 10 is connected to the sleeve 8 and travels up and down therewith, and likewise slides within the post 9. A feeding shaft 11 extends transversely of the sleeve and rack and carries a feeding pinion or the like 12, best shown in Figs. 3 and 4, which pinion engages the rack and causes the same to rise or fall according to the rotations of the shaft 11. Any suitable means may be adopted for rotating the shaft 11 to raise or lower the drill spindle, and in the drawings I have illustrated one form of construction by means of which the spindle may be fed either manually or automatically. For the purpose of securing the manual feed there is provided a star handle or the like 13 carried by a sleeve 14 which is slidable on the shaft 11. The shaft carries a large main gear 15 which is adapted to mesh with a back gear comprising the pinion 16 and the gear 17 which are connected together by means of a sleeve 18. This sleeve is rotatably mounted on a stub bearing 19. The sleeve 14 of the star handle carries a pinion 20 which is adapted to mesh with the back gear 17 when the star handle is thrown over into the position illustrated in Fig. 2.

The shaft 11 carries a clutch block 21 having a plurality of notches or perforations 22 in one of its side faces, and the sleeve 14 of the star handle has a plurality of pins or the like 23 which may be meshed or engaged with the notches or perforations of the clutch block 21. By throwing the star handle over to the right in Fig. 2 it will be locked to the clutch block and a direct feed of the drill spindle will be secured when the star handle is rotated. On the other hand when the star handle stands in the position illustrated in Fig. 2 the feed of the drill spindle will be accomplished through the medium of the back gear and will therefore be at a lesser rate than when the direct drive is used, although a greater pressure may be applied to the drill spindle when feeding through the back gear.

The mechanism thus far described is used largely for securing a manual feed of the spindle. For the purpose of securing an automatic feed I have secured a worm gear 24 to the shaft 11 so that by driving the worm gear the shaft will be rotated to feed the drill. To one side of the mechanism there is mounted a sleeve or the like 25, the same being pivoted to a stationary part at the point 26 so that it can have a slight amount of back and forth reciprocation or rock. This sleeve carries a feeding shaft 27 adapted to be driven in any suitable manner from the driving mechanism. The shaft 27 carries a worm 28 at its lower end, which worm can be meshed with the worm gear by swinging the sleeve 25 to the left in Fig. 1. When retained in such position the feeding of the drill spindle will proceed automatically and will continue as long as the worm remains in mesh with the worm gear. When it is desired to stop the feeding operation the sleeve 25 may be allowed to rock a sufficient distance on its pivot 26 to carry the worm away from the worm gear whereupon the feeding operation will cease. It will be noted that in the construction illustrated the pivotal point 26 is behind or to the right of the center line of the sleeve 25 so that there will be a natural tendency for the sleeve to swing to the right under the influence of gravity and thus disengage the feeding mechanism.

Means must be provided for holding the worm 28 in mesh with the worm gear as long as it is desired to allow the feeding operation to continue. For this purpose I have provided a lever arm or the like 29 pivoted to a stationary part at the point 30 and carrying a pin 31 which is adapted to at times abut against a lug 32 carried by the sleeve 25, for the purpose of forcing the sleeve to the left thus holding the worm and worm gear in mesh. In order to keep the parts properly centered the lug 32 preferably works in a slot or notch of the block 33 which carries the pin 31 so that any side motion of the sleeve 25 will be eliminated. This construction is best shown in Fig. 3 where it will be seen that the lug 32 and pin 31 ride in a slot in the block 33. It is obvious that as long as the lever arm 29 is held in raised position the feeding mechanism will be held in engagement, but that as soon as the arm 29 is allowed to fall under the influence of gravity the pin 31 will move back a sufficient distance to allow the sleeve 25 to rock and to carry the worm away from the worm gear. Therefore means must be provided for holding the arm 29 in raised position as long as the feeding operation is to continue automatically. This means comprises a finger 34 carried by a part which is pivoted to a stationary element at the point 35, and which finger 34 is adapted to seat beneath a lug or the like 36 carried by the lever arm. A finger piece 37 is connected to the finger 34 and a spring 38 exerts a force for holding the finger 34 beneath the lug 36. Obviously in order to trip the automatic feed it is only necessary to move the finger 34 forward away from the lug 36 whereupon the arm 39 will be allowed to fall.

In the present case I have provided means whereby the finger 34 will be moved in the above described manner after the drill spindle has fallen or been forced down to the desired depth or distance. It was previously stated that the drill spindle moves according to the rotations of the shaft 11, so that the position of said shaft is an index or measure of the position of the drill spindle. I make use of this fact in the present case for securing the desired automatic trip. In the arrangement illustrated I have carried the shaft 11 through to the other side of the machine as an extension 39, best shown in Fig. 4, and on said extension I have mounted a pinion or the like 40. This pinion meshes with the internal gear 41 formed on the flange 42 carried by a disk or the like 43, and said disk is pivoted to rotate under the influence of the internal gear about a center or pivot 44. Manifestly the angular position of this disk will be a measure of the vertical position of the drill spindle. In the particular arrangement illustrated I have mounted or formed the finger 34 on a yoke or the like 45 which embraces a portion of the machine and is pivoted to a stationary part at the points 35. Adjacent the disk 43 this yoke carries a roller or the like 48 which is adapted to be struck or engaged by a tripping block carried by the disk 43. As soon as such engagement takes place the yoke will be tilted against the influence of the spring 38 to allow the handle 29 to drop and thus disengage the feeding mechanism. A stop pin or the like 49 is carried by the yoke for the purpose of limiting the movement of the latter under the influence of the spring 38.

In order to make the tripping mechanism adjustable according to requirements, and in order to be able to predetermine the exact position of the drill spindle at which the feeding operation will cease, I have made the part carried by the disk 43 movable thereon so that it can be adjusted to different positions, and I have provided an index for indicating the exact position of the movable part so that it can be seen beforehand what the exact position of the drill spindle will be when the feeding mechanism is disengaged.

The movable part is best shown in Figs. 5 and 6. In the particular arrangement illustrated the disk 43 carries a flange or the like 50 which projects somewhat beyond the surface of the flange 42, and an annular groove 51 is formed in the surface of the disk. Said tripping block 52 is formed in substantially U-shape having an arm 53 adapted to seat against one face of the flange 50 and an arm 54 adapted to seat against the other face of said flange. A wing nut or the like 55 is threaded into the movable part, and the end thereof is adapted to enter and seat within the groove 51. This wing nut serves the two functions of locking the movable part in any given position around the periphery of the disk 43, and of preventing the movable part from falling away from the said disk by reason of the engagement of the end of the wing nut with the groove 51.

In order to be able to predetermine the exact position which the drill spindle will occupy when the disengagement occurs I have provided a circular scale 56 on the disk 43, and a downwardly depending knife edge 57 of the movable part travels over the face of said scale so as to show the particular position of the movable part. Obviously this scale may be graduated in any suitable manner, as for example to show the vertical elevation of the drill spindle in inches and fractions or tenths of inches.

It was previously stated that the lever arm 29 carries the block 33 which has a notch accommodating the lug 32 of the sleeve 25. In order to keep the parts properly centered, and to take up for any wear which might occur from time to time, I have provided a set screw or the like 58 on each side of the block 33, which set screws can be adjusted in and out in order to properly center the lug 32 with respect to the block 33, and in order to compensate for wear.

While I have herein shown and described only one particular construction embodying the features of my invention, still I do not limit myself to the construction shown and described except as called for in the claims, but I contemplate within the scope of said claims other mechanisms whereby the feeding connection between the drill spindle and the moving part will be automatically broken when the drill spindle has been fed down a desired distance, and also other mechanisms whereby the exact position at which such disconnection will take place can be varied from time to time and whereby an indication may be had as to the exact point at which the disengagement will occur.

I claim:

1. The combination with a vertically adjustable drill spindle, of a shaft for raising and lowering the same, an operating gear on one end of said shaft, a pinion on the other end of the shaft, an internal gear meshed with said pinion, a worm swingingly mounted in position to engage the worm gear or to be disengaged therefrom, said worm being normally disengaged from the worm gear, means for locking the worm in engagement with the worm gear, a tripping block adjustably mounted on the internal gear, graduations on the internal gear to indicate the position of the tripping block, and a device normally standing in the line of travel of the tripping block and adapted when engaged by the tripping block to disengage the worm holding means.

2. The combination with a vertically adjustable drill spindle of an operating shaft for raising and lowering the same, a gear on one end of said shaft, a gear swingingly mounted in position to at times engage said first named gear for the purpose of driving the same, the last named gear normally standing disengaged from the first named gear, means for locking said gears in engagement with each other for driving purposes, a pinion on the other end of the operating shaft, a gear entrained with said pinion, there being a series of graduations on said gear, a tripping block adjustably mounted on said gear and adjustable over said graduations, and a tripping device connected to the locking means and standing in position to be engaged by the tripping block.

3. The combination with a vertically adjustable drill spindle, of an operating shaft for raising and lowering the same, a continuously rotating shaft for feeding the same, means for at times effecting a driving connection from the continuously rotating shaft to the operating shaft, the continuously rotating shaft normally standing in non-operative position, means for locking the continuously rotating shaft in operating position, a wheel, there being a graduated scale on the same, an operating connection between said wheel and the operating shaft whereby the graduated scale maintains a fixed relationship with respect to the vertical position of the drill spindle, a tripping block mounted on said wheel and adjustable over said scale, and a member connected to the locking means and standing in position to be engaged by the tripping block when the locking means stands in locked position.

4. The combination with a vertically adjustable drill spindle, of an operating shaft for raising and lowering the same, driving mechanism, means for at times effecting a driving connection from the driving mechanism to the operating shaft, the driving mechanism normally standing disengaged from the operating shaft, means for locking the driving mechanism in engagement with the operating shaft, a movable member the movements of which are positively related to the rotations of the operating shaft, there being a series of graduations on said movable member, an adjustable tripping block carried by said member and adjustable over said graduations, and a member connected to the locking device and standing in position to be engaged by the tripping block when the operating shaft is being driven.

5. The combination with a vertically adjustable drill spindle, of an operating shaft for raising and lowering the same, means for at times driving said operating shaft for the purpose of feeding the spindle, said driving means normally standing disengaged from the operating shaft, means for locking the driving means in engagement with the operating shaft, a gear entrained with the operating shaft and proportioned to rotate at a lesser angular speed than the operating shaft, a tripping block adjustably connected to said gear, and a member connected to the locking means and standing in the line of travel of the tripping block when the locking means is in locking position.

6. The combination with a vertically adjustable drill spindle, of an operating shaft for raising and lowering the same, means for at times rotating said operating shaft for the purpose of feeding the spindle, said means normally standing disengaged from the operating shaft, means for locking said means in engagement with the operating shaft, a gear entrained with the operating shaft and proportioned to rotate at a lesser angular speed than the operating shaft, there being a graduated surface connected to said gear, a tripping block adjustably mounted on the gear and adjustable with respect to said graduated surface, and a member connected to the locking means and standing in the line of travel of the tripping block when the locking means is in locking engagement.

ROBERT MILNE.

Witnesses:
ADA M. FITZSIMMONS,
SAMUEL H. RECK.

Copies of this patent may be obtained for five cents each, by addressing the "Commissioner of Patents, Washington, D. C."